United States Patent
Paolella et al.

(10) Patent No.: US 10,498,446 B2
(45) Date of Patent: Dec. 3, 2019

(54) ELECTRONIC SYSTEM INCLUDING WAVEGUIDE WITH PASSIVE OPTICAL ELEMENTS AND RELATED METHODS

(71) Applicant: Harris Corporation, Melbourne, FL (US)

(72) Inventors: Arthur C. Paolella, Indian Harbour Beach, FL (US); Diana M. Foster, Melbourne, FL (US); Christopher A. Corey, Palm Bay, FL (US); James W. Coots, West Melbourne, FL (US); Francisco Torres, West Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 15/492,317

(22) Filed: Apr. 20, 2017

(65) Prior Publication Data

US 2018/0309183 A1    Oct. 25, 2018

(51) Int. Cl.
G02B 6/42 (2006.01)
H04B 10/25 (2013.01)
G02B 6/00 (2006.01)

(52) U.S. Cl.
CPC ........... *H04B 10/2504* (2013.01); *G02B 6/00* (2013.01); *H04B 10/25* (2013.01)

(58) Field of Classification Search
CPC ....... H01L 2924/00014; H01L 2924/00; H01L 2224/16225; G02B 6/12; G02B 6/4214; G02B 6/42; G02B 6/26
See application file for complete search history.

(56) References Cited

U.S. PATENT DOCUMENTS

| | | | |
|---|---|---|---|
| 2,577,612 | A | 12/1951 | Fay |
| 3,403,335 | A | 9/1968 | Couper et al. |
| 3,510,764 | A | 5/1970 | Heath |
| 3,574,438 | A | 4/1971 | Carson |
| 3,778,706 | A | 12/1973 | Thompson |
| 5,132,623 | A | 7/1992 | De et al. |

(Continued)

FOREIGN PATENT DOCUMENTS

| | | |
|---|---|---|
| CN | 104103882 | 10/2014 |
| CN | 105500719 | 4/2016 |

(Continued)

OTHER PUBLICATIONS

TK Instruments "Why use Quasi-Optics for ESR Systems" http://www.terahertz.co.uk/index.php?option=com_content&view=article&id=194&Itemid=571 Retreived from internet Apr. 17, 2017; pp. 2.

(Continued)

*Primary Examiner* — Jennifer Doan
(74) *Attorney, Agent, or Firm* — Allen, Dyer, Doppelt + Gilchrist, P.A.

(57) ABSTRACT

A communications system may include a first active circuit device and a waveguide coupled to the first active circuit device. The waveguide may include a plurality of passive optical devices spaced apart from one another and arranged along an optical path, and an interconnect structure interconnecting the passive optical devices and integrally formed as a unitary body with the passive optical devices. Furthermore, the interconnect structure may have an opening therethrough aligned with the optical path.

34 Claims, 7 Drawing Sheets

(56) References Cited

U.S. PATENT DOCUMENTS

| | | | |
|---|---|---|---|
| 5,157,337 | A | 10/1992 | Neel et al. |
| 5,214,394 | A | 5/1993 | Wong |
| 5,736,908 | A | 4/1998 | Alexanian et al. |
| 5,900,965 | A | 5/1999 | Malkin et al. |
| 6,028,483 | A | 2/2000 | Shealy et al. |
| 6,348,683 | B1 | 2/2002 | Verghese et al. |
| 6,496,018 | B1 | 12/2002 | Nagata et al. |
| 6,876,272 | B2 | 4/2005 | DeLisio, Jr. et al. |
| 7,285,963 | B2 | 10/2007 | Talanov et al. |
| 7,456,803 | B1 | 11/2008 | Sievenpiper |
| 7,855,691 | B2 | 12/2010 | Yonak et al. |
| 8,456,375 | B2 | 6/2013 | Leisten |
| 8,463,324 | B1 | 6/2013 | Kormanyos et al. |
| 8,909,007 | B2 * | 12/2014 | Wang .................. G02B 6/3514 385/16 |
| 2005/0141823 | A1 * | 6/2005 | Han .................. G02B 6/4204 385/89 |
| 2008/0025680 | A1 | 1/2008 | Sun et al. |
| 2011/0001680 | A1 | 1/2011 | Leisten |
| 2013/0107356 | A1 | 5/2013 | Jeon et al. |
| 2015/0109070 | A1 | 4/2015 | Herbsommer |
| 2016/0056005 | A1 | 2/2016 | Andreev et al. |
| 2016/0303805 | A1 * | 10/2016 | Chen .................. G06K 15/1295 |

FOREIGN PATENT DOCUMENTS

| | | |
|---|---|---|
| WO | WO 85/00080 | 1/1985 |
| WO | WO 03/023423 | 3/2003 |
| WO | WO2010109317 | 9/2010 |
| WO | WO 2012/076994 | 6/2012 |

OTHER PUBLICATIONS

Vera-Lopez et al. "Ka-band characterization and RF design of Acrynolitrile Butadiene Styrene (ABS)" Microwave Symposium (IMS), 2015 IEEE MTT-S International; Date of Conference: May 17-22, 2015, Abstract Only.

A BCC Research & Sensors Report "Terahertz Radiation Systems: Technologies and Global Markets" https://www.bccresearch.com/mains/download/index/param/1/file/seltsheet/report/IAS029B.pdf Mar. 2012; pp. 6.

Reck et al. "Silicon micromachined waveguide components at 0.75 to 1.1 THz" Infrared, Millimeter, and Terahertz waves (IRMMW-THz), 2014 39th International Conference on: Date of Conference: Sep. 14-19, 2014; Abstract Only.

Bowen et al. "Micromachined waveguide antennas for 1.6 THz" Electronics Letters: vol. 42, Issue: 15, Jul. 20, 2006; Abstract Only.

Nordquist et al. "Design, fabrication, and characterization of metal micromachined rectangular waveguides at 3 THz" Antennas and Propagation Society International Symposium, 2008. AP-S 2008. IEEE; Date of Conference: Jul. 5-11, 2008; Abstract Only.

Nordquist et al. "Properties of Surface Metal Micromachined Rectangular Waveguide Operating Near 3 THz" IEEE Journal of Selected Topics in Quantum Electronics Volume: 17, Issue: 1, Jan.-Feb. 2011: pp. 130-137. Abstract Only.

Matvejev et al. "Wet silicon bulk micromachined THz waveguides for low-loss integrated sensor applications" Infrared Millimeter and Terahertz Waves (IRMMW-THz), 2010 35th International Conference on: Date of Conference: Sep. 5-10, 2010. Abstract Only.

Zhang et al. "Theoretical analysis and simulation of micromachined THz waveguide embedded in LTCC multi-layer packaging substrate for high throughput data exchange backbone and vacuum electronic devices applications" Electronic Packaging Technology & High Density Packaging (ICEPT-HDP), 2010 11th International Conference on: Date of Conference: Aug. 16-19, 2010. Abstract Only.

Voght et al. "3D-printed dielectric helical THz waveguides" Infrared, Millimeter, and Terahertz waves (IRMMW-THz), 2015 40th International Conference on: Date of Conference: Aug. 23-28, 2015; Abstract Only.

Isaac Waldron "Ring Resonator Method for Dielectric Permittivity Measurement of Foams" Thesis Worcester Polytechnic Institute: https://web.wpi.edu/Pubs/ETD/Available/etd-050306-164608; May 3, 2006; pp. 66.

Castle et al. "Microwave dielectric characterisation of 3D-printed BaTIO3/ABS polymer composites" https://www.nature.com/articles/srep22714; Scientific Reports 6, Article number: 22714 (2016) Published online:Mar. 4, 2016; pp. 8.

Roper et al. "Additive manufacturing of graded ielectrics" (http://iopscience.iop.org/0964-1726/23/4/045029) Smart Mater. Struct. 23 (2014) 045029; pp. 9.

Arbaoui et al. "3D printing for microwave: Materials characterization and application in the field of absorbers" Microwave Symposium (IMS), 2015 IEEE MTT-S International : Date of Conference: May 17-22, 2015; Abstract Only.

Deffenbaugh et al. "Fabrication and Microwave Characterization of 3D Printed Transmission Lines" IEEE Microwave and Wireless Components Letters: vol. 25, Issue: 12, Dec. 2015: pp. 3.

Doyle et al. "Dielectric characterization of 3D printed materials with a confocal Fabry Perot resonator for space utilization" Antennas and Propagation Society International Symposium (APSURSI), 2014 IEEE; Jul. 6-11, 2014; Abstract Only.

Deffenbaugh et al. "Broadband Microwave Frequency Characterization of 3-D Printed Materials" IEEE Transactions on Components, Packaging and Manufacturing Technology vol. 3, Issue: 12, Dec. 2013; Abstract Only.

M. Tentzeris "Novel paper-based inkjet-printed antennas and wireless sensor modules" Microwaves, Communications, Antennas and Electronic Systems, 2008. COMCAS 2008. IEEE International Conference on: Date of Conference: May 13-14, 2008; Abstract Only.

Hangyo Et El "Fabrication and characterization of THz metamaterials" Infrared, Millimeter and Terahertz Waves (IRMMW-THz), 2011 36th International Conference on: Date of Conference: Oct. 2-7, 2011; Abstract Only.

Kim et al. "A 10-GHz quasi-optical grid amplifier using integrated HBT differential pairs" IEEE Transactions on Electron Devices: vol. 39, Issue: 11, Nov. 1992: pp. 2667-2668. Abstract Only.

Chi et al. "A back-to-back horn-antenna quasi-optical amplifier" Antennas and Propagation Society International Symposium, 1993. AP-S. Digest: Date of Conference: Jun. 28-Jul. 2, 1993; Abstract Only.

Kolias et al. "A microstrip-based unit cell for quasi-optical amplifier arrays" IEEE Microwave and Guided Wave Letters vol. 3, Issue: 9, Sep. 1993: Abstract Only.

Chi et al. "A quasi-optical amplifier" IEEE Microwave and Guided Wave Letters vol. 3, Issue: 6, Jun. 1993: Abstract Only.

Budka et al. "A 75 GHz to 115 GHz quasi-optical amplifier" IEEE Transactions on Microwave Theory and Techniques: vol. 42, Issue: 5, May 1994; Abstract Only.

Hubert et al. "High-power hybrid quasi-optical Ka-band amplifier design" Microwave Symposium Digest, 1995., IEEE MTT-S International: Date of Conference: May 16-20, 1995; Abstract Only.

Hu et al. "Theoretical studies of high power millimeter wave quasi-optical gyro-amplifiers" Plasma Science, 1995. IEEE Conference Record—Abstracts., 1995 IEEE International Conference on: Date of Conference: Jun. 5-8, 1995; Abstract Only.

R.M. Weikle "Quasi-optical grid amplifiers and oscillators" Signals, Systems, and Electronics, 1995. ISSSE '95, Proceedings., 1995 URSI International Symposium on: Date of Conference: Oct. 25-27, 1995; Abstract Only.

Schoenberg et al. "Quasi-optical antenna array amplifiers" Microwave Symposium Digest, 1995., IEEE MTT-S International: Date of Conference: May 16-20, 1995; Abstract Only.

Ivanov et al. "Quasi-optical microstrip amplifiers based on multilayer coupled structures" Signals, Systems, and Electronics, 1995. ISSSE '95, Proceedings., 1995 URSI International Symposium on: Date of Conference: Oct. 25-27, 1995; Abstract Only.

Robinson et al. "Wireless LAN communication base stations using quasi-optical amplifiers" Microwave Conference, 1995. 25th European: Date of Conference: 4-4 Sep. 1995; Abstract Only.

Tsai et al. "Quasi-optical amplifier array using direct integration of MMICs and 50 /spl Omega/ multi-slot antennas" Microwave Sym-

(56) References Cited

OTHER PUBLICATIONS posium Digest, 1995., IEEE MTT-S International: Date of Conference: May 16-20, 1995; Abstract Only.

Alexanian et al. "Quasi-optical traveling wave amplifiers" Microwave Symposium Digest, 1996., IEEE MTT-S International: Date of Conference: Jun. 17-21, 1996; Abstract Only.

Chew et al. "High active device density Quasi-Optical amplifier" Microwave Conference, 1996. 26th European: Date of Conference: Sep. 6-13, 1996; Abstract Only.

N.J. Kolias "monopole-probe-based quasi-optical amplifier array" IEEE Transactions on Microwave Theory and Techniques: vol. 45, Issue: 8, Aug. 1997; Abstract Only.

Hollung et al. "A bi-directional quasi-optical lens amplifier" IEEE Transactions on Microwave Theory and Techniques: vol. 45, Issue: 12, Dec. 1997; Abstract Only.

Hwang et al. "A quasi-optical dielectric slab power combiner with a large amplifier array" Antennas and Propagation Society International Symposium, 1998. IEEE: Date of Conference: Jun. 21-26, 1998; Abstract Only.

Ortiz et al. "A CPW-fed microstrip patch quasi-optical amplifier array" IEEE Transactions on Microwave Theory and Techniques: vol. 48, Issue: 2, Feb. 2000; Abstract Oly.

Saavedra et al. "A millimeter-wave quasi-optical amplifier array using inclined-plane horn antennas" IEEE Microwave and Guided Wave Letters: vol. 8, Issue: 2, Feb. 1998; Abstract Only.

Bashirullah et al. "A slotted waveguide quasi-optical power amplifier" Microwave Symposium Digest, 1999 IEEE MTT-S International: Date of Conference: Jun. 13-19, 1999; Abstract Only.

Marshall et al. "Two Ka-Band Quasi-Optical Amplifier Arrays" IEEE Transactions on Microwave Theory and Techniques, vol. 47, No. 12, Dec. 1999; pp. 6.

Ortiz et al. "A perpendicular aperture-fed patch antenna for quasi-optical amplifier arrays" Antennas and Propagation Society International Symposium, 1999. IEEE: Date of Conference: Jul. 11-16, 1999; Abstract Only.

Forman et al. "Watt-Level Ka-Band Quasi-Optical Amplifier Arrays" Microwave Conference, 1999. 29th European: Date of Conference: Oct. 5-7, 1999; Abstract Only.

Hubert et al. "A 4 watt Ka-band quasi-optical amplifier" Microwave Symposium Digest, 1999 IEEE MTT-S International, vol. 2; Abstract Only.

Ortiz et al. "A 25 watt and 50 watt Ka-band quasi-optical amplifier" Microwave Symposium Digest. 2000 IEEE MTT-S International: Date of Conference: Jun. 11-16, 2000; Abstract Only.

Brown et al. "System characteristics of quasi-optical power amplifiers" IEEE Circuits and Systems Magazine: vol. 1, Issue: 4, Fourth Quarter 2001; Abstract Only.

Belaid et al. "Quasi-optical power amplifier using TEM waveguide concept" Microwave Symposium Digest, 2001 IEEE MTT-S International: Date of Conference: May 20-24, 2001; Abstract Only.

Ortiz et al. "A high-power Ka-band quasi-optical amplifier array" IEEE Transactions on Microwave Theory and Techniques: vol. 50, Issue: 2, Feb. 2002; Abstract Only.

Charbonneau-Lefort et al. "Broadband Optical Parametric Amplifier Using Chirped Quasi-Phase-Matched Gratings" Conference on Lasers and Electro-Optics/Quantum Electronics and Laser Science Conference and Photonic Applications Systems Technologies Technical Digest (CD) (Optical Society of America, 2006), paper CThO 2; Abstract Only.

Park et al. "A compact all-optical frequency up-converter and quasi optical single sideband signal generator utilizing a nonlinear semiconductor optical amplifier for radio-over-fiber applications" Microwave Photonics (MWP), 2012 International Topical Meeting on: Date of Conference: Sep. 11-14, 2012; Abstract Only.

Ginzburg et al. "Quasi-optical theory of relativistic submillimeter Cherenkov amplifier and oscillators" Infrared, Millimeter, and Terahertz Waves (IRMMW-THz). 2013 38th International Conference on: Date of Conference: Sep. 1-6, 2013; Abstract Only.

Shigehiro Takasaka "Fiber optical parametric amplifier using quasi-phase-matching technique" Summer Topicals Meeting Series (SUM), 2015; Date of Conference: Jul. 13-15, 2015; Abstract Only.

Courtney et al., Qorvo White Paper "120 W Ka Band Power Amplifier Utilizing GaN MMICs and Coaxial Waveguide Spatial Power Combining" www. qorvo.com: May 2016; pp. 8.

* cited by examiner

PEAK VALUE = 0.0 DEG, 33.6 dB

PEAK VALUE = 0.39 DEG, 33.2 dB

PEAK VALUE = 0.73 DEG, 31.8 dB

ELECTRONIC SYSTEM INCLUDING WAVEGUIDE WITH PASSIVE OPTICAL ELEMENTS AND RELATED METHODS

TECHNICAL FIELD

The present invention relates to the field of communications, and more particularly, to radio frequency (RF) communications and related methods.

BACKGROUND

Terahertz (THz) and millimeter wavelength radiation are useful for a variety of imaging applications. For example, millimeter wave scanners may be used for whole-body imaging, such as for loss prevention, smuggling, and security screening. THz radiation may be used for similar applications including material characterization, layer inspection, and other forms of imaging (e.g., as an alternative to X-rays).

Certain challenges exist when designing and implementing such systems. For example, transmitting millimeter wave and THz signals over waveguides requires expensive ridged waveguides that are machined. However, manufacturing of such complex systems requires machining individual parts and assembling them together. Yet, at these high frequencies, the size of the devices becomes very small, and machining and assembly becomes difficult.

Various devices have been developed for transmitting signals in the THz and millimeter range. One example is set forth in U.S. Pat. Pub. No. 2008/0025680 to Sun et al. This publication discloses a plastic waveguide for guiding terahertz (THz) waves with a wavelength ranging from 30 to 3000 μm. The plastic waveguide includes a core and a cladding layer. At least part of the core is made of a first plastic medium having a first refractive index, and the maximum length of a cross-section of the core is smaller than the wavelength of the guided terahertz wave. The cladding layer surrounds the core and has a second refractive index lower than the first refractive index. Only one wave mode is propagated in the plastic waveguide, and a first attenuation constant of the core for the guided terahertz wave is higher than a second attenuation constant of the cladding layer for the guided terahertz wave.

Despite the existence of such devices, further enhancements may be desirable, such as to provide relatively easier and cost effective manufacturing capabilities.

SUMMARY

A communications system may include a first active circuit device and a waveguide coupled to the first active circuit device. The waveguide may include a plurality of passive optical devices spaced apart from one another and arranged along an optical path, and an interconnect structure interconnecting the passive optical devices and integrally formed as a unitary body with the passive optical devices. Furthermore, the interconnect structure may have an opening therethrough aligned with the optical path.

More particularly, the interconnect structure may include a plurality of struts. In accordance with one example embodiment, the struts may comprise helical struts. Also by way of example, at least one of the passive optical devices may comprise a lens (e.g., a convex lens), although other types of lenses (e.g., concave) may also be used. In accordance with another example, at least one of the passive optical devices may comprise a prism.

Furthermore, the waveguide may also include a support member coupled to the interconnect structure and positioned within the opening, and a second active circuit device may be carried by the support member. More particularly, at least one conductive trace may be included on the interconnect structure and electrically connected to the second active circuit device. By way of example, the second active circuit device may comprise a down converter, an up converter, a low noise amplifier (LNA), a Monolithic Microwave Integrated Circuit (MMIC), etc. Also by way of example, the waveguide may have an operating frequency in a range of 30 GHz to 3000 GHz. The passive optical devices and the interconnect structure may comprise a dielectric material, for example.

A related waveguide, such as the one described briefly above, and method for making a waveguide are also provided. The method may include integrally forming a plurality of passive optical devices spaced apart from one another and arranged along an optical path as a unitary body with an interconnect structure interconnecting the passive optical devices. Moreover, the interconnect structure may have an opening therethrough aligned with the optical path.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation and multiple prime notation are used to indicate similar elements in different embodiments.

Figure 1:
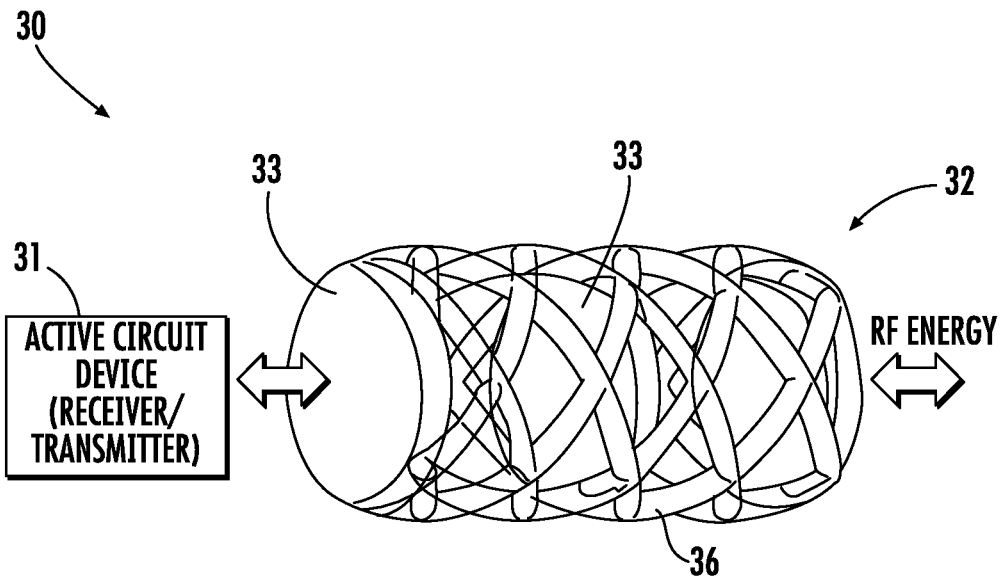
FIG. 1 is a schematic block diagram of a communications system including a flexible 3D printed waveguide in accordance with an example embodiment.
Figure 2:
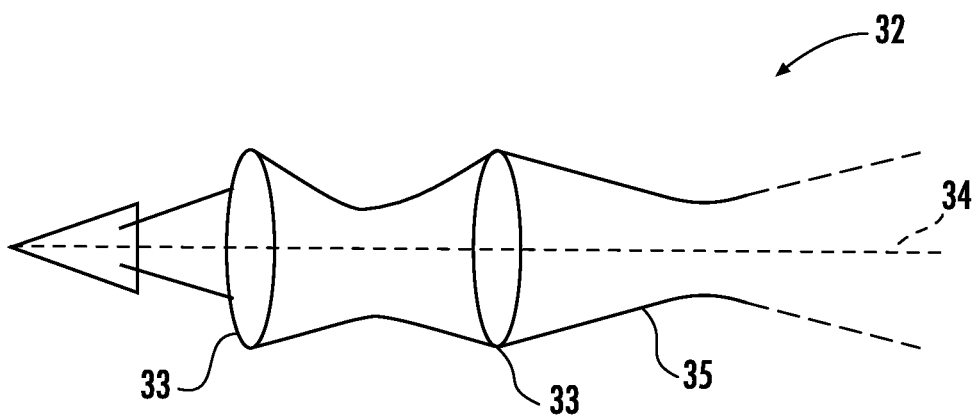
FIG. 2 is a schematic side view of the waveguide of FIG. 1 in accordance with an example embodiment.

Referring initially to FIGS. 1 and 2, a communications system 30 is first described which illustratively includes a first active circuit device 31 and a waveguide 32 coupled to the first active circuit device. The waveguide 32 illustratively includes a plurality of passive optical devices 33 spaced apart from one another and arranged along an optical path 34, and an interconnect structure 35 interconnecting the passive optical devices and integrally formed as a unitary body with the passive optical devices. Furthermore, the interconnect structure 35 may have an opening therethrough aligned with the optical path (i.e., it may be hollow). The waveguide 32 may be particularly useful for millimeter wave (30 to 300 GHz) and THz (300 to 3000 GHz) transmissions, as will be discussed further below.

In the example illustrated in FIG. 1, the interconnect structure 35 illustratively includes a plurality of struts 36. More particularly, in this embodiment the struts 36 are helical struts, which may have different helix angles in different embodiments. Moreover, in some embodiments helical struts need not be used, rather other shapes such as a cylinder with openings in the sidewall thereof, interconnecting triangles, etc., may be used, for example.

More particularly, the interconnect structure 35 may be integrally formed as a unitary body with the passive optical devices 33 via 3D printing or additive manufacturing (AM) techniques. Various types of 3D printing may be used, such as deposition of a binder material on a powder bed with an inkjet printer layer by layer. Other suitable AM practices may include binder jetting, directed energy deposition, material extrusion, material jetting, powder bed infusion, sheet lamination, and vat photopolymerization, for example. The waveguide 32 may be "printed" from a dielectric material, although other suitable materials may be used in different embodiments.

In the illustrated example, the passive optical devices 33 are convex lenses. Other examples of passive optical devices 33 which may be used instead of, or in addition to, convex lenses are prisms. In this regard, a prism may be formed along the optical path 34 to divide signals along separate paths, if desired. The surfaces of the passive optical devices 33 may optionally be polished in some embodiments, and/or they may be coated to enhance impedance matching, if desired.

Printing of the waveguide 32 advantageously allows for a precision system that may be fabricated all at one time. This, in turn, helps to lower manufacturing costs and provide improved performance with respect to systems having separate components that are individually assembled. Another advantage of the waveguide 32 is that the material composition and thickness may be adjusted to change the flexibility of the waveguide 32 to permit bending or routing of the waveguide in a similar fashion to a wire, yet without significant signal loss (although a rigid waveguide may be used in some embodiments). In this regard, relatively large numbers of passive optical devices 33 may be used in different embodiments to extend the overall length of the waveguide 32 as needed for a particular application. In the example illustrated in FIG. 1, the waveguide 32 may have a length on the order 1 to 10 mm and a diameter of about 5 mm or greater in a THz configuration. However, different diameters and different numbers of passive optical devices 33 and associated interconnect structure 36 may be used to extend the waveguide to a length of 30 cm or more, for example. Such extended configurations may benefit from the inclusion of active circuitry in the waveguide 30, as will be discussed further below.

The waveguide 32 advantageously uses quasi-optical techniques to provide for relatively low loss and non-dispersive transmission systems. By way of example, insertion loss waveguide to waveguide through a quasi-optical system is typically on the order of 1 dB. Referring additionally to FIGS. 3*a*-5*b*, an example of the waveguide 32 is shown which has two convex lenses (although different numbers of lenses or passive optical devices 33 may be used in different embodiments). In the first example of FIG. 3*a*, the optical path 34 is straight, i.e., there is a 0.0 degree angular deviation or offset between the lenses (i.e., the lenses are parallel to one another). This results in a simulated signal strength of 33.6 dB for a THz transmission in the illustrated example. The associated signal pattern is shown in the graph 40 of FIG. 3*b*.

Figure 3A:
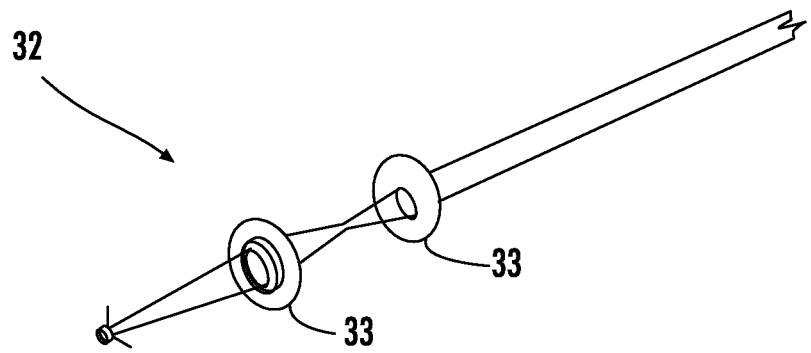
FIGS. 3a, 4a, and 5a are schematic views of the waveguide of FIG. 2 transmitting signals at different angles.
Figure 3B:
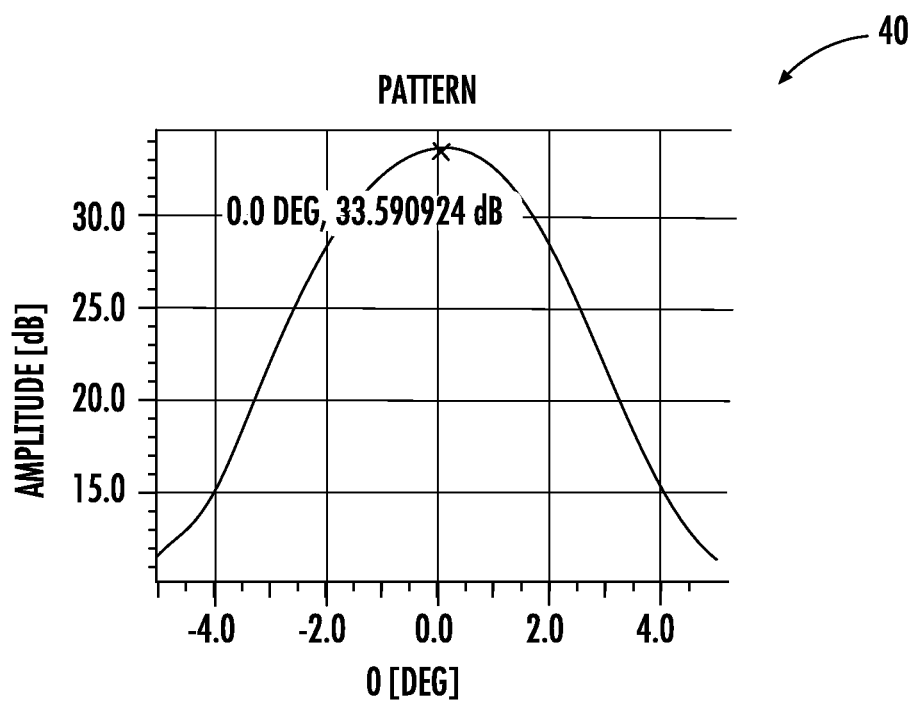
FIGS. 3b, 4b, and 5b are graphs of amplitude vs. angle corresponding to the examples shown in FIGS. 3a, 4a, and 5a, respectively.
Figure 4A:
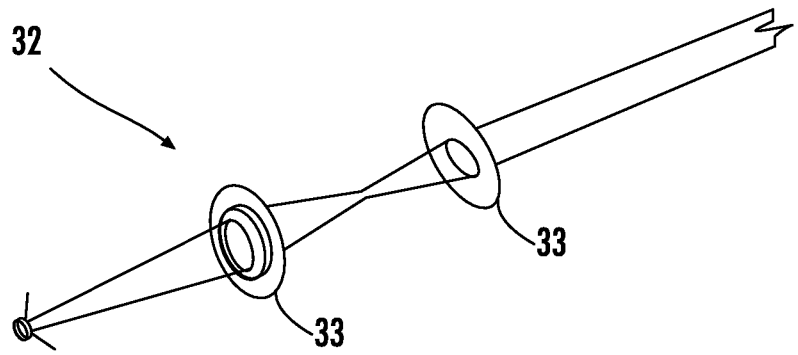
Figure 4B:
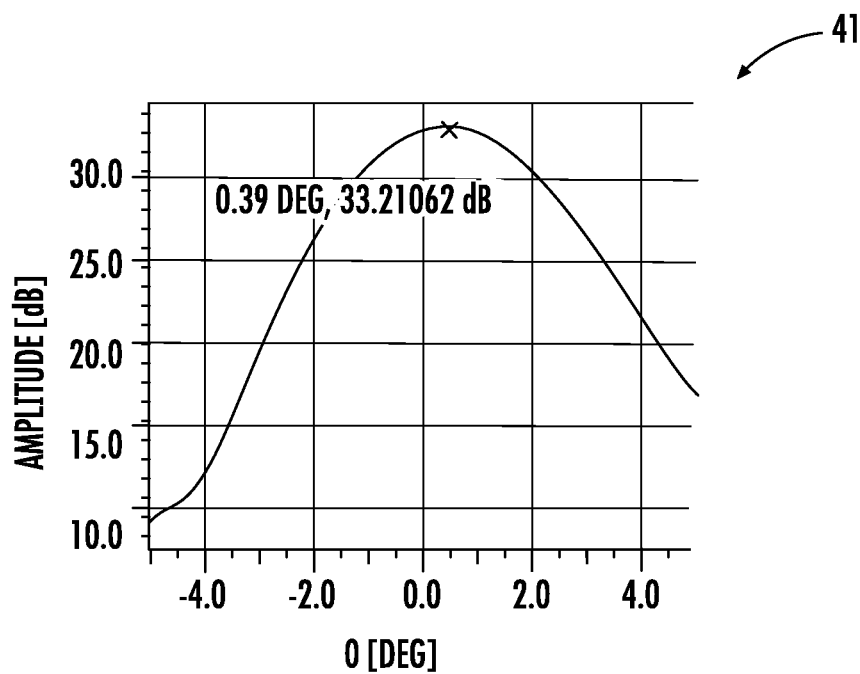
Figure 5A:
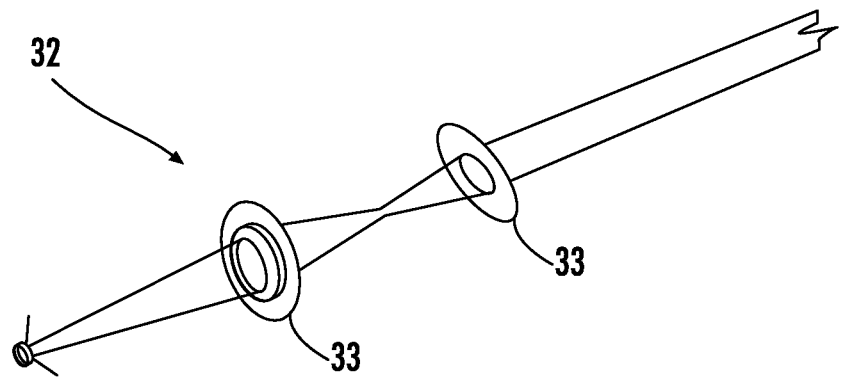
Figure 5B:
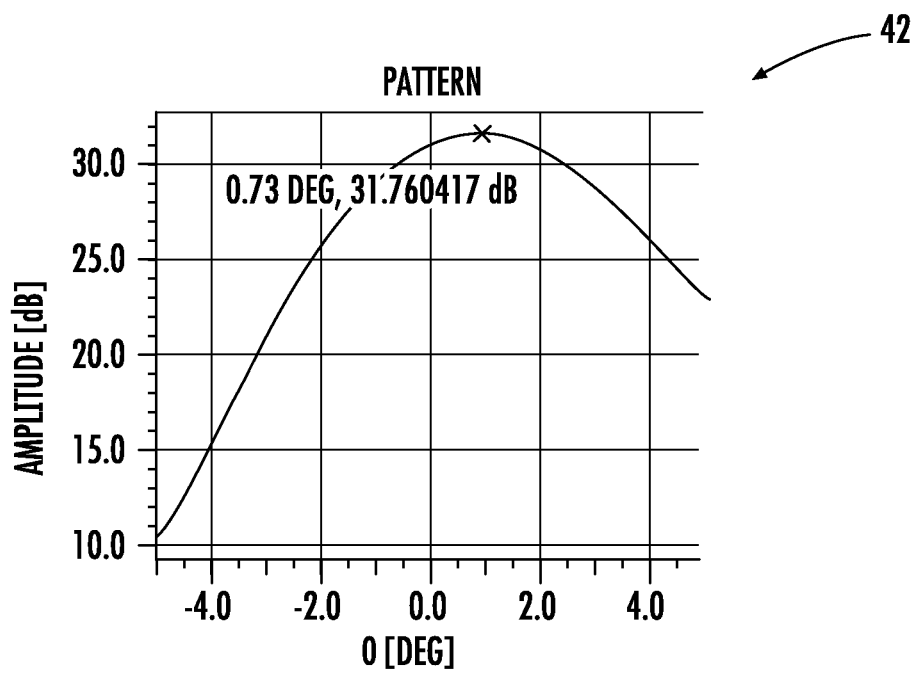
Figure 6:
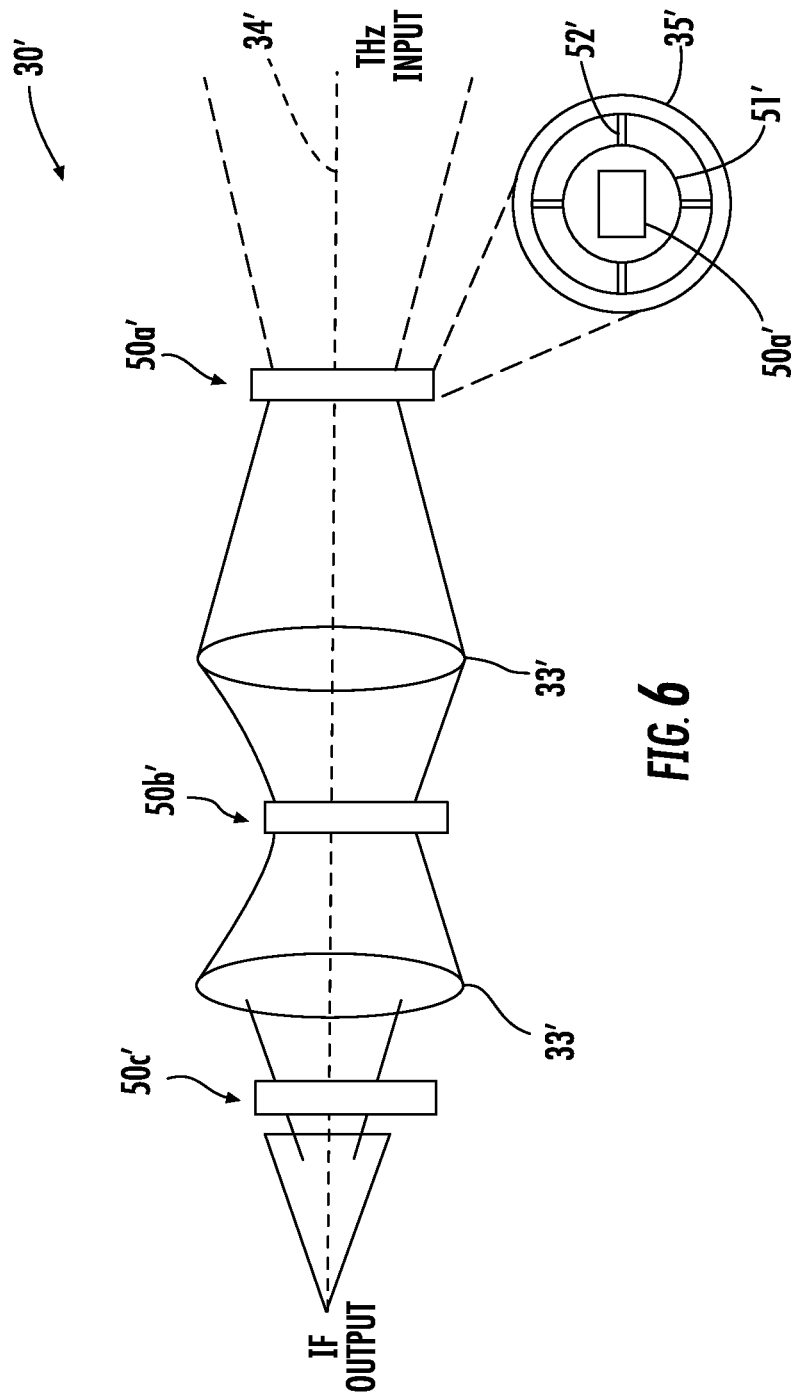
FIG. 6 is a schematic side view of another embodiment of the waveguide of FIG. 1 in accordance with an example implementation including a partially exploded section having an active circuit element.
Figure 7:
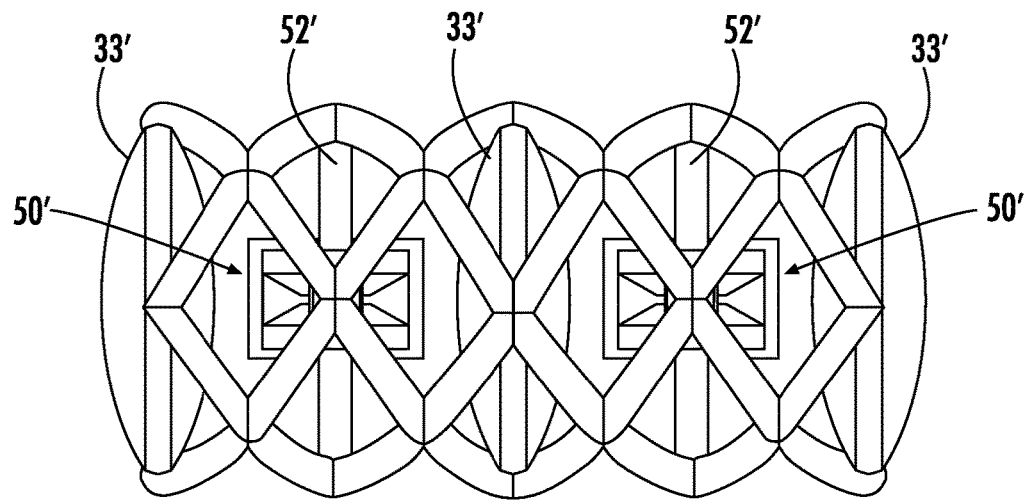
FIG. 7 is a side view of an example implementation of the waveguide of FIG. 6.
Figure 8:
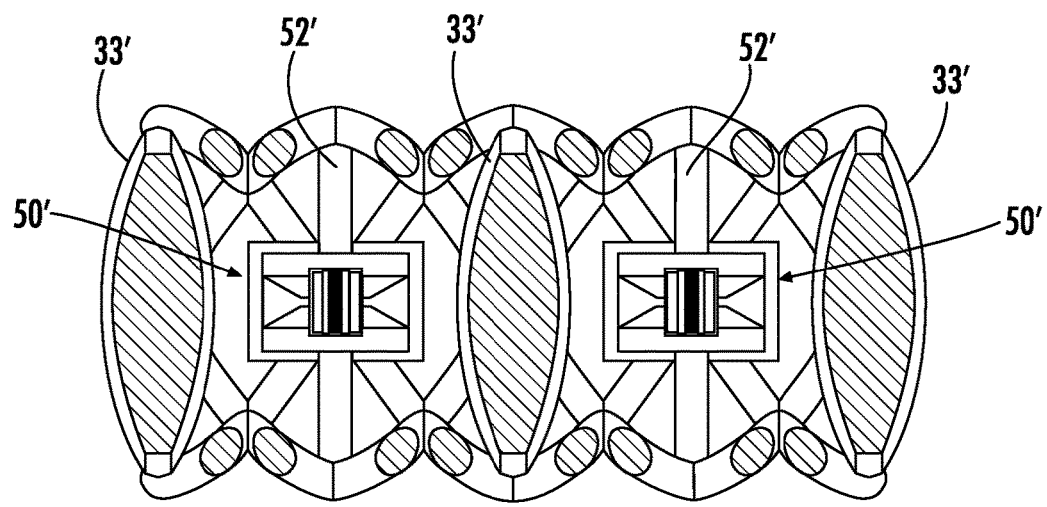
FIG. 8 is a side view, partially in section, of the waveguide of FIG. 7.

In the example of FIG. 4*a*, for the same THz signal transmission as noted above, there is a 0.39 degree offset between the lenses, with a simulated resultant signal strength of 33.2 dB (resulting in a 0.4 dB difference from the 0.39 degrees the beam has been steered relative to FIG. 3*a*). The associated signal pattern is shown in the graph 41 of FIG. 4*b*.

Furthermore, in the example of FIG. 4*a*, there is a 0.73 degree offset between the lenses, which results in a simulated signal strength of 31.8 dB for the above-noted THz signal (resulting in a 1.8 dB difference from the 0.73 degrees the beam has been steered relative to FIG. 3*a*). The associated signal pattern is shown in the graph 42 of FIG. 5*b*. As such, it will be appreciated that with even a relatively extreme 0.73 degree bend in the waveguide, the simulations show that there is less than 2 dB signal loss.

Turning now to FIGS. 6-9, another embodiment of the system 30' is described which further includes a plurality of second active circuit devices 50' positioned along the optical path 34', which may be used for various purposes. In the example illustrated in FIG. 6, an active circuit device 50*a*' along the optical path 34' is a signal filter. The signal filter 50*a*' is carried on or embedded in a support member 51' suspended within the central opening of the interconnect structure 35' by radial arms 52'. By way of example, the active circuit devices 50' may be implemented in Monolithic Microwave Integrated Circuits (MMICs) in some embodiments.

Continuing with the example illustrated in FIG. 6*a*, a low noise amplifier (LNA) 50*b*' is positioned along the optical path 34' between the passive optical devices 33', and may similarly be carried on a support 51' as described above. The LNA 50*b*' may advantageously be included in certain embodiments to help overcome signal losses as necessary. Furthermore, a down converter/local oscillator (LO) 50*c*' (or up converter in some embodiments) is positioned on the opposite side of the passive optical devices 33' from the filter 50*a*'. Additional active circuits 50' may be used in various embodiments including phase elements for controlling beam direction, as well as non-linear circuits for signal processing, frequency translation and detection.

The active circuits 50' may be inserted on the support structure 51' at the appropriate point in the 3D printing process. That is, as the various layers of material are built up, the printing process may be stopped once the support 51' is formed, the appropriate active circuit 50' inserted thereon, and then the printing process may be resumed.

Figure 9:
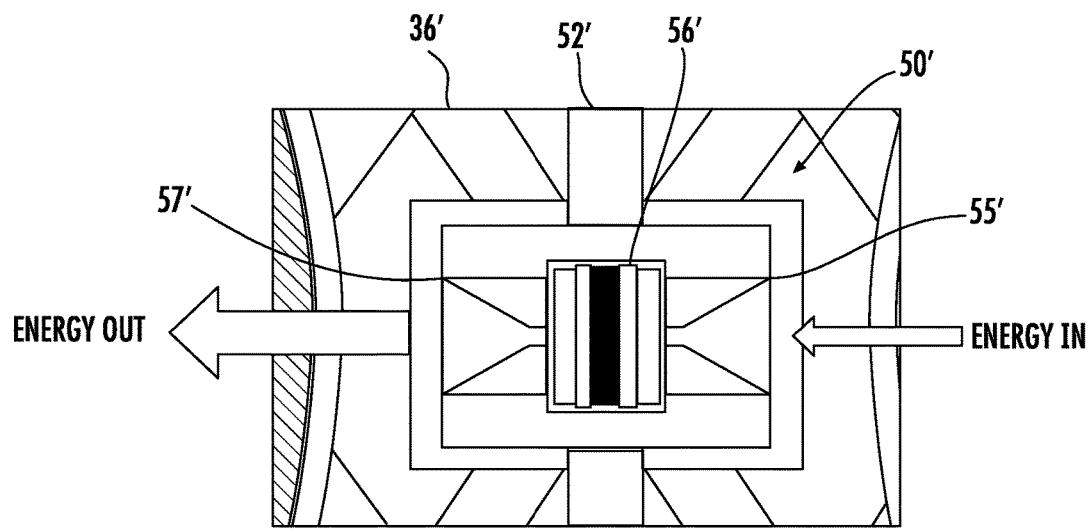
FIG. 9 is a close-up view of an active electronic device of the waveguide of FIG. 8.

One example active circuit device 50' is shown in greater detail in FIG. 9. Here, a first antenna 55' receives RF energy, which is provided to active circuitry 56' to perform one or more signal processing operations such as those discussed above. A second antenna 57' on the opposite side of the active circuitry 56' from the first antenna 55' outputs the processed signal energy as shown. In some embodiments, conductive circuit traces (not shown) may be printed along the interconnect structure 35' or struts 36' to provide power and/or signals to the active circuitry 56', if desired.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. An electronic system comprising:
a first active circuit device; and
a waveguide coupled to the first active circuit device and comprising
a plurality of passive optical devices spaced apart from one another and arranged along an optical path, and
an interconnect structure interconnecting the passive optical devices and integrally formed as a unitary body with the passive optical devices, the interconnect structure being hollow to define the optical path.

2. The electronic system of claim 1 wherein the interconnect structure comprises a plurality of struts.

3. The electronic system of claim 2 wherein the struts comprise helical struts.

4. The electronic system of claim 1 wherein at least one of the passive optical devices comprises a lens.

5. The electronic system of claim 1 wherein the waveguide further comprises a support member coupled to the interconnect structure and positioned within the opening, and a second active circuit device carried by the support member.

6. The electronic system of claim 5 further comprising at least one conductive trace on the interconnect structure and electrically connected to the second active circuit device.

7. The electronic system of claim 5 wherein the second active circuit device comprises at least one of a down converter, an up converter, a low noise amplifier (LNA), and a Monolithic Microwave Integrated Circuit (MMIC).

8. The electronic system of claim 1 wherein the passive optical devices and interconnect structure comprise a dielectric material.

9. The electronic system of claim 1 wherein the waveguide has an operating frequency in a range of 30 GHz to 3000 GHz.

10. A waveguide comprising:
a plurality of passive optical devices spaced apart from one another and arranged along an optical path; and
an interconnect structure interconnecting the passive optical devices and integrally formed as a unitary body with the passive optical devices, the interconnect structure being hollow to define the optical path.

11. The waveguide of claim 10 wherein the interconnect structure comprises a plurality of struts.

12. The waveguide of claim 11 wherein the struts comprise helical struts.

13. The waveguide of claim 10 wherein at least one of the passive optical devices comprises a lens.

14. The waveguide of claim 10 wherein the waveguide further comprises a support member coupled to the interconnect structure and positioned within the opening, and a second active circuit device carried by the support member.

15. The waveguide of claim 14 further comprising at least one conductive trace on the interconnect structure and electrically connected to the second active circuit device.

16. The waveguide of claim 14 wherein the second active circuit device comprises at least one of a down converter, an up converter, a low noise amplifier (LNA), and a Monolithic Microwave Integrated Circuit (MMIC).

17. The waveguide of claim 10 wherein the passive optical devices and interconnect structure comprise a dielectric material.

18. The waveguide of claim 10 wherein the waveguide has an operating frequency in a range of 300 GHz to 3000 GHz.

19. A method for making a waveguide comprising:
integrally forming a plurality of passive optical devices spaced apart from one another and arranged along an optical path as a unitary body with an interconnect structure interconnecting the passive optical devices;
wherein the interconnect structure is hollow to define the optical path.

20. The method of claim 19 wherein integrally forming comprises integrally forming the plurality of passive optical devices and the interconnect structure with a three dimensional (3D) printer.

21. The method of claim 19 wherein forming the interconnect structure comprises forming a plurality of helical struts.

22. The method of claim 19 wherein at least one of the passive optical devices comprises a lens.

23. The method of claim 19 wherein integrally forming further comprises forming a support member coupled to the interconnect structure and positioned within the opening; and further comprising positioning a second active circuit device on the support member.

24. The method of claim 23 further comprising forming at least one conductive trace on the interconnect structure and electrically connected to the second active circuit device.

25. An electronic system comprising:
a first active circuit device; and
a waveguide coupled to the first active circuit device and comprising
a plurality of passive optical devices spaced apart from one another and arranged along an optical path, and
an interconnect structure comprising a plurality of struts interconnecting the passive optical devices and integrally formed as a unitary body with the passive optical devices, the interconnect structure having an opening therethrough aligned with the optical path.

26. The electronic system of claim 25 wherein the struts comprise helical struts.

27. The electronic system of claim 25 wherein the passive optical devices and interconnect structure comprise a dielectric material.

28. A waveguide comprising:
a plurality of passive optical devices spaced apart from one another and arranged along an optical path; and
an interconnect structure comprising a plurality of struts interconnecting the passive optical devices and integrally formed as a unitary body with the passive optical devices, the interconnect structure having an opening therethrough aligned with the optical path.

29. The waveguide of claim 28 wherein the struts comprise helical struts.

30. The waveguide of claim 28 wherein the passive optical devices and interconnect structure comprise a dielectric material.

31. A method for making a waveguide comprising:
integrally forming a plurality of passive optical devices spaced apart from one another and arranged along an optical path as a unitary body with an interconnect structure comprising a plurality of struts interconnecting the passive optical devices;
wherein the interconnect structure has an opening therethrough aligned with the optical path.

32. The method of claim 31 wherein integrally forming comprises integrally forming the plurality of passive optical devices and the interconnect structure with a three dimensional (3D) printer.

33. The method of claim 31 wherein forming the interconnect structure comprises forming a plurality of helical struts.

34. The method of claim 31 wherein the passive optical devices and interconnect structure comprise a dielectric material.

* * * * *